United States Patent
Miyazawa (10) Patent No.: US 7,231,296 B2
(45) Date of Patent: Jun. 12, 2007

(54) DISPLAY DEVICE, INFORMATION PROCESSING DEVICE, AND INFORMATION PROCESSING SYSTEM

(75) Inventor: Hirohisa Miyazawa, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 0 days.

(21) Appl. No.: 10/511,760

(22) PCT Filed: Apr. 18, 2003

(86) PCT No.: PCT/JP03/04977

§ 371 (c)(1),
(2), (4) Date: Oct. 19, 2004

(87) PCT Pub. No.: WO03/089879

PCT Pub. Date: Oct. 30, 2003

(65) Prior Publication Data

US 2005/0182562 A1    Aug. 18, 2005

(30) Foreign Application Priority Data

Apr. 19, 2002 (JP) .............................. 2002-117504

(51) Int. Cl.
*G01C 21/30* (2006.01)
(52) U.S. Cl. ...................... 701/211; 701/208; 701/209; 340/990; 340/995.1; 340/995.12
(58) Field of Classification Search ................ 701/211, 701/208, 209; 340/990, 995.1, 995.2
See application file for complete search history.

(56) References Cited

U.S. PATENT DOCUMENTS

| | | | |
|---|---|---|---|
| 6,347,278 B2 * | 2/2002 | Ito | 701/200 |
| 6,427,115 B1 * | 7/2002 | Sekiyama | 701/208 |
| 6,487,493 B2 * | 11/2002 | Uekawa et al. | 701/200 |
| 6,748,321 B2 * | 6/2004 | Watanabe et al. | 701/209 |
| 6,816,783 B2 * | 11/2004 | Hashima et al. | 701/209 |

(Continued)

FOREIGN PATENT DOCUMENTS

JP    05-265374    10/1993

(Continued)

OTHER PUBLICATIONS

English Translation of International Preliminary Examination Report with attached Notification of Transmittal of Copies of Translation of the International Preliminary Examination Report, Dec. 9, 2004.

*Primary Examiner*—Thomas Black
*Assistant Examiner*—Marie A Weiskopf
(74) *Attorney, Agent, or Firm*—Crowell & Moring LLP (57) ABSTRACT

An information processing system includes a display device and a information processing apparatus. The display device includes: a first arithmetic processing unit; a display unit at which information is displayed as a bitmap; and an interface unit that can be connected with the external information processing apparatus. The information processing apparatus includes: an interface unit that can be connected with the display device; and a second arithmetic processing unit that executes a specific type of processing. The first arithmetic processing unit controls the display unit so as to display information related to the specific type of processing transmitted from the information processing apparatus and also executes another type of processing related to the specific type of processing based upon an instruction provided by the information processing apparatus. The second arithmetic processing unit issues an instruction to have the first arithmetic processing unit at the display device execute another type of processing related to the specific type of processing.

11 Claims, 10 Drawing Sheets

U.S. PATENT DOCUMENTS 6,839,630 B2 * 1/2005 Sakamoto .................. 701/211
2001/0021894 A1 9/2001 Sakamoto et al.
2002/0173908 A1 11/2002 Sakamoto

FOREIGN PATENT DOCUMENTS

| | | |
|---|---|---|
| JP | 10-274541 A | 10/1998 |
| JP | 2002-110520 | 4/2002 |
| JP | 2002-365081 A | 12/2002 |
| WO | WO 00/79218 A1 | 12/2000 |

* cited by examiner

DISPLAY DEVICE, INFORMATION PROCESSING DEVICE, AND INFORMATION PROCESSING SYSTEM

INCORPORATION BY REFERENCE

The disclosure of the following priority application is herein incorporated by reference:
Japanese Patent Application No. 2002-117504, filed Apr. 19, 2002

TECHNICAL FIELD

The present invention relates to a display device, an information processing apparatus and an information processing system. More specifically, it relates to a display device, an information processing apparatus and an information processing system intended for on-vehicle use.

BACKGROUND ART

There are car navigation systems known in the related art that have multiple functions including a function for displaying a road map of an area around the current vehicle position, a function for determining through an arithmetic operation a recommended route from a start point to a destination and a function for providing route guidance based upon the determined recommended route.

Such a car navigation system includes an arithmetic processing unit constituted with a microprocessor and the like and a display device such as an LCD at which the road map, the recommended route and the like are displayed. In addition, an audio system, a television set achieved by using an LCD and the like may be installed in the vehicle.

It is desirable that the arithmetic processing units and display devices used in these systems be combined with a high degree of efficiency.

DISCLOSURE OF THE INVENTION

The present invention provides a display device, an information processing apparatus and an information processing system that allow arithmetic processing units and display devices to be combined with a high degree of efficiency.

A display device according to the present invention comprises: a first arithmetic processing unit; a display unit at which information is displayed as a bitmap; and an interface unit that can be connected with an external information processing apparatus having a second arithmetic processing unit which executes a specific type of processing, and the first arithmetic processing unit controls the display unit so as to display information related to the specific type of processing transmitted from the external information processing apparatus and also executes another type of processing related to the specific type of processing based upon an instruction provided by the external information processing apparatus.

In this display device, it is preferred that: the specific type of processing executed at the second arithmetic processing unit includes processing related to road guidance; and the other type of processing executed at the first arithmetic processing unit includes at least either arithmetic processing for displaying a road map at the display unit or arithmetic processing for a route search.

An information processing apparatus according to the present invention comprises: an interface unit that can be connected with a display device having a first arithmetic processing unit and a display unit controlled by the first arithmetic processing unit, at which information is displayed as a bitmap; and a second arithmetic processing unit that executes a specific type of processing, and the second arithmetic processing unit issues an instruction to have the first arithmetic processing unit at the display device execute another type of processing related to the specific type of processing.

In this information processing apparatus, it is preferred that: the specific type of processing executed at the second arithmetic processing unit includes processing related to road guidance; and the other type of processing executed at the first arithmetic processing unit includes at least either arithmetic processing for displaying a road map at the display unit or arithmetic processing for a route search.

In the above information processing apparatus, there may be further provided a second display unit smaller in size than the display unit of the display device.

Also, it is preferred that: there is provided a second display unit smaller in size than the display unit of the display device; the specific type of processing executed at the second arithmetic processing unit includes processing related to road guidance; and the second arithmetic processing unit executes the processing related to road guidance by displaying at the second display unit a straight arrow or a bent arrow without displaying a map.

An information processing system according to the present invention comprises: the above display device and the above information processing apparatus.

In this information processing system, it is preferred that the first arithmetic processing unit achieves a higher processing performance level than the second arithmetic processing unit.

Also, it is preferred that: the information processing apparatus further includes a radio tuner; and the other type of processing executed at the first arithmetic processing unit includes audio processing.

BEST MODE FOR CARRYING OUT THE INVENTION

FIRST EMBODIMENT

Figure 1:
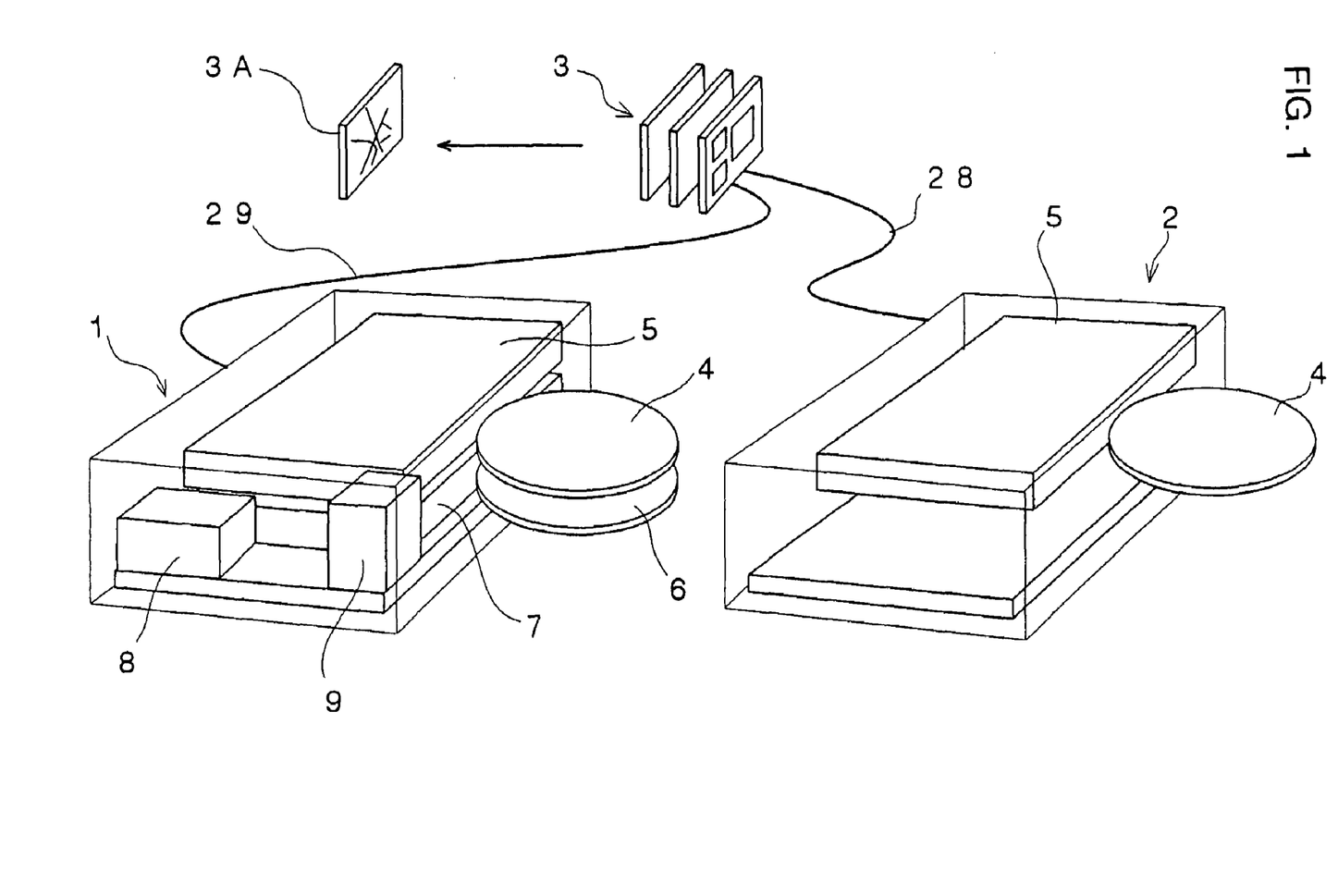
FIG. 1 illustrates the on-vehicle information processing system achieved in a first embodiment.

FIG. 1 illustrates the on-vehicle information processing system achieved in the embodiment. Reference numeral 1 indicates a type-A information processing apparatus (hereafter referred to as the information processing apparatus A), reference numeral 2 indicates a type-B information processing apparatus (hereafter referred to as the information processing apparatus B) and reference numeral 3 indicates a display device constituted with an LCD. Reference numeral 3A indicates the display device 3 displaying a map. The display device 3 may be connected to the information processing apparatus A 1 alone to achieve a single information processing system or may be connected to the information processing apparatus B 2 alone to achieve another information processing system. Furthermore, the display device 3 may be connected to both the information processing apparatus A 1 and the information processing apparatus B 2 at once to achieve yet another information processing system.

The information processing apparatus A 1 includes a CD-ROM drive device 5 that reads data from a CD-ROM 4, a DVD drive device 7 that reads data from a DVD 6, a GPS device 8 that receives GPS signals and a gyro 9 that detects the advancing azimuth of the vehicle. The information processing apparatus B 2 includes a CD-ROM drive device 5 that reads data from a CD-ROM 4. It is to be noted that the information processing apparatus A 1 may only include either the CD-ROM drive device 5 or the DVD drive device 7.

Figure 2:
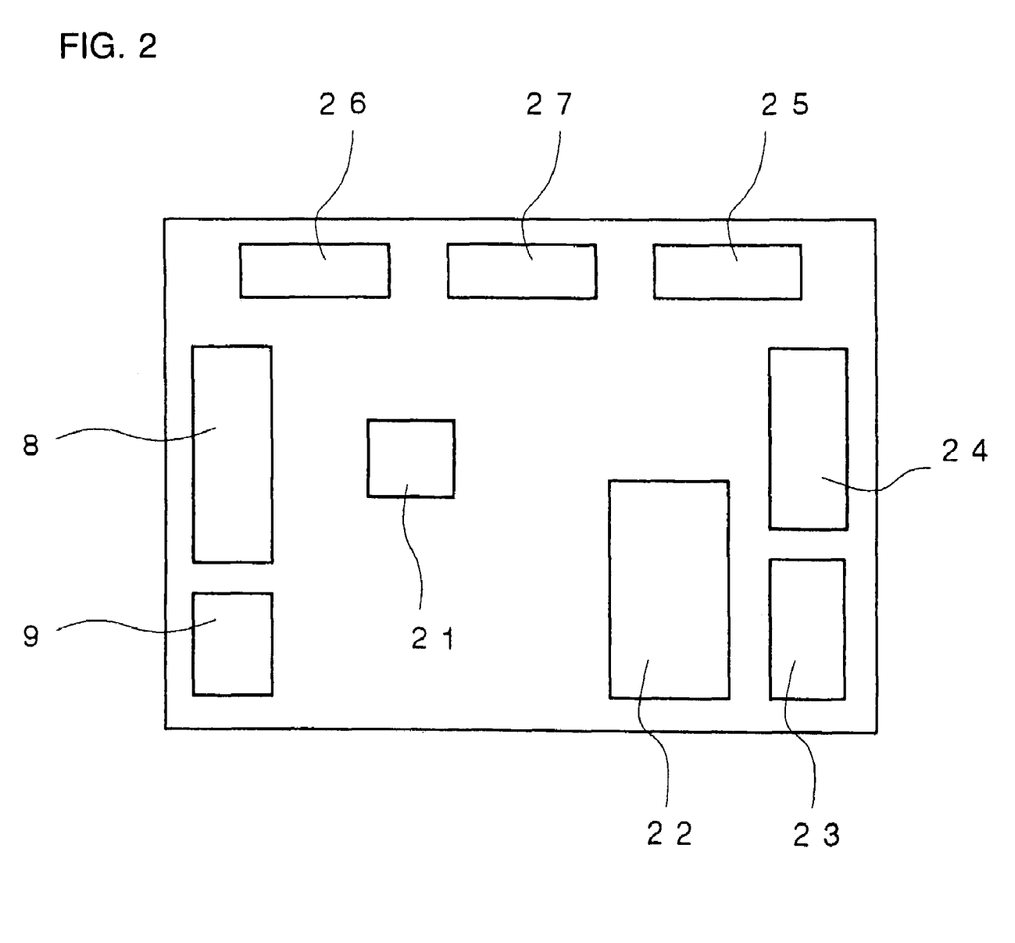
FIG. 2 is a block diagram of the internal structure adopted in the information processing apparatus A 1.

FIG. 2 is a block diagram of the internal structure adopted in the information processing apparatus A 1. The CD-ROM drive device 5 and the DVD drive device 7 constituting part of the internal structure are not included in the illustration. The information processing apparatus A 1 comprises an arithmetic processing unit 21 constituted with a microprocessor and its peripheral circuits, an AM tuner 22, an FM multiplex tuner 23, an FM tuner 24, an audio amplifier 25 and the like.

Road map data and the like are stored in the CD-ROM 4 (or the DVD 6) in the information processing apparatus A 1. The road map data are used to display a road map, to execute a route search and to provide route guidance. The arithmetic processing unit 21 detects the current position of the vehicle based upon a signal provided from the GPS device 8 and a signal provided from the gyro 9 and executes various types of navigation processing based upon the road map data stored in the CD-ROM 4. A vehicle speed sensor (not shown) may be provided so as to detect the current vehicle position by using a signal provided by the vehicle speed sensor as well. The GPS device 8 receives a GPS signal from a GPS (global positioning system) satellite, converts the received GPS signal to a specific position signal and outputs the position signal.

The information processing apparatus A 1 having the AM tuner 22 and the FM tuner 24 is capable of receiving AM and FM radio broadcasts. The AM and FM radio broadcasts can be played in the vehicle by driving a speaker 41 (see FIG. 4) with the audio amplifier 25. In addition, since it is equipped with an FM multiplex tuner, it is capable of receiving text messages and VICS information such as traffic information. The VICS is a road traffic information (vehicle information) communications system maintained and run by the Road Traffic Information Communications System Center (VICS Center, Vehicle Information Communication System Center) which is an incorporated foundation in Japan. If the information processing apparatus A 1 further includes a light beacon receiving device and a radio wave beacon receiving device, VICS information transmitted in the light beacons and radio wave beacons, too, can be received as in FM multiplex broadcasts.

The information processing apparatus A 1 further includes an interface 26 that is connected with the display device 3 via an optical fiber cable 29 (see FIG. 1). It also includes an interface 27 that can be connected with a CAN (Controller Area Network) constituting an in-vehicle LAN. The CD-ROM drive device 5 may be utilized to read data on a music CD-ROM and thus, the user can listen to music CDs in the vehicle. If the information processing apparatus further includes a television broadcast receiving device, the user can watch television via the display device 3. Moreover, the DVD drive device 7 may be used to view images stored in the DVD 6.

Figure 3:
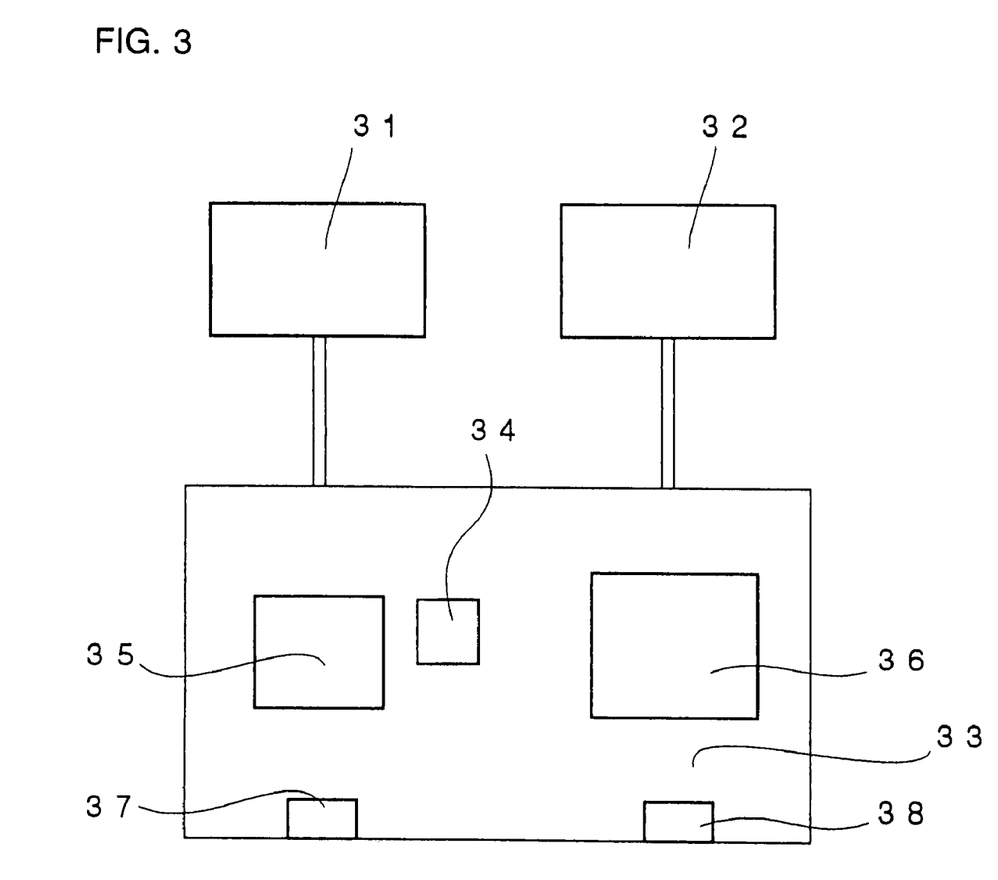
FIG. 3 is a block diagram of the internal structure adopted in the display device 3.

FIG. 3 is a block diagram of the internal structure adopted in the display device 3. The display device 3 comprises an LCD panel 31, a backlight 32, a board 33 at which a control circuit is installed and the like. The LCD panel 31 may be, for instance, a 480×240 dot LCD or an 800×480 dot LCD. At the board 33, an arithmetic processing unit 34 constituted with a microprocessor and its peripheral circuits, a display control circuit 35 that controls the display at the LCD panel 31 based upon signals received from the arithmetic processing unit 34, a high-voltage source circuit 36 that drives the backlight 32 and the like are mounted. The arithmetic processing unit 34 controls the display at the LCD panel 31 and also executes other types of processing in response to instructions from the information processing apparatus A 1. Namely, the arithmetic processing unit 34 (FIG. 3) acts as a surrogate for the arithmetic processing unit 21 (FIG. 2) of the information processing apparatus A 1 by executing the other types of processing as well as the processing related to the display at the display device 3. This means that the display device 3 is intelligent.

An optical data interface 37 which can be connected to the information processing apparatus A 1 via the optical fiber cable 29 and a CAN interface 38 that can be connected to the information processing apparatus A 1 via a CAN cable 28 (see FIG. 1) are mounted at the board 33.

Figure 4:
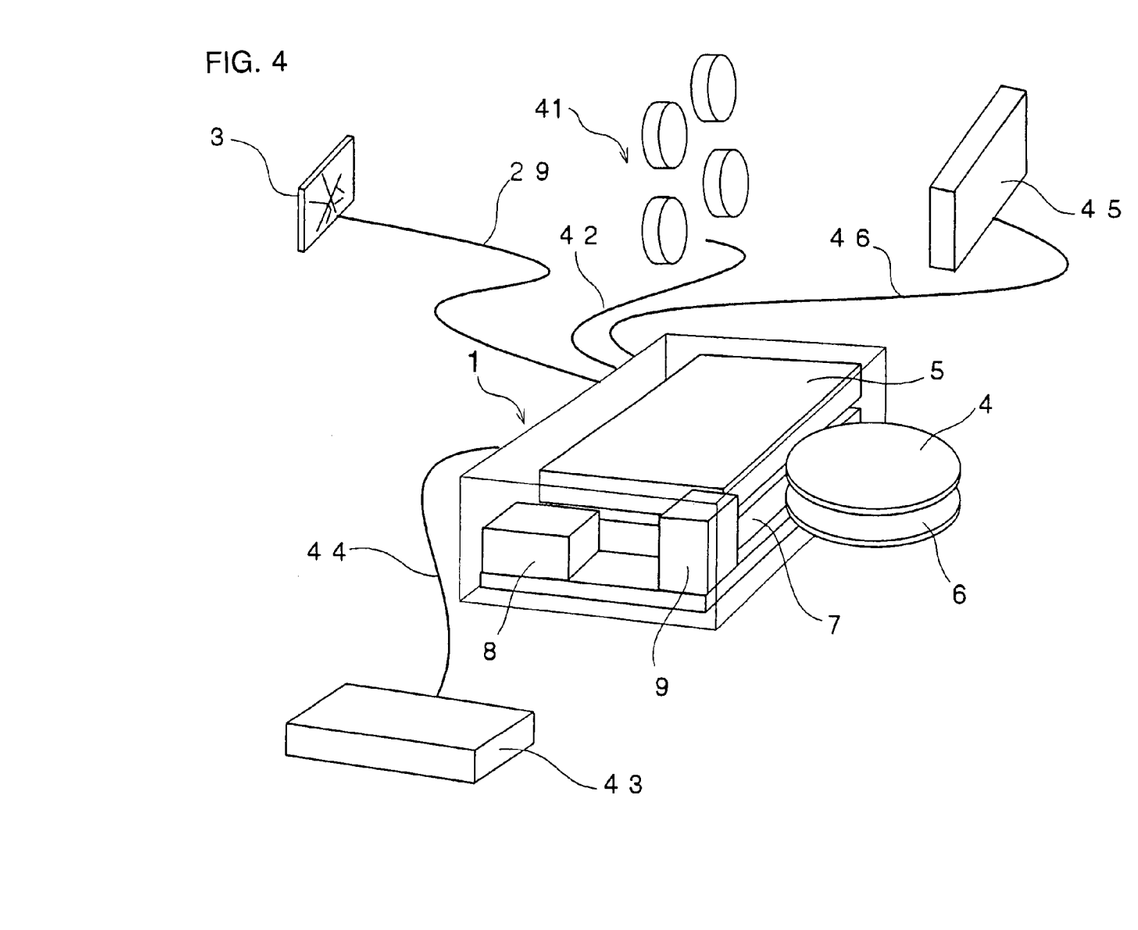
FIG. 4 illustrates how the information processing system A is achieved by connecting the information processing apparatus A 1 and the display device 3 to each other.

FIG. 4 shows how an information processing system A is achieved by connecting the information processing apparatus A 1 with the display device 3. The information processing apparatus A 1 and the display device 3 are connected with each other through the optical fiber cable 29. In addition, the information processing apparatus A 1 is connected with speakers 41 installed in the vehicle via a cable 42. Reference numeral 43 indicates an FM antenna which is connected to the FM tuner 24 and the FM multiplex tuner 23 via a cable 44.

The information processing apparatus A 1 is also connected to a control switch group 45 installed in the vehicle via a CAN cable 46 and the interface 27 (see FIG. 2). Namely, the information processing apparatus A 1 also controls the CAN within the vehicle.

Figure 5:
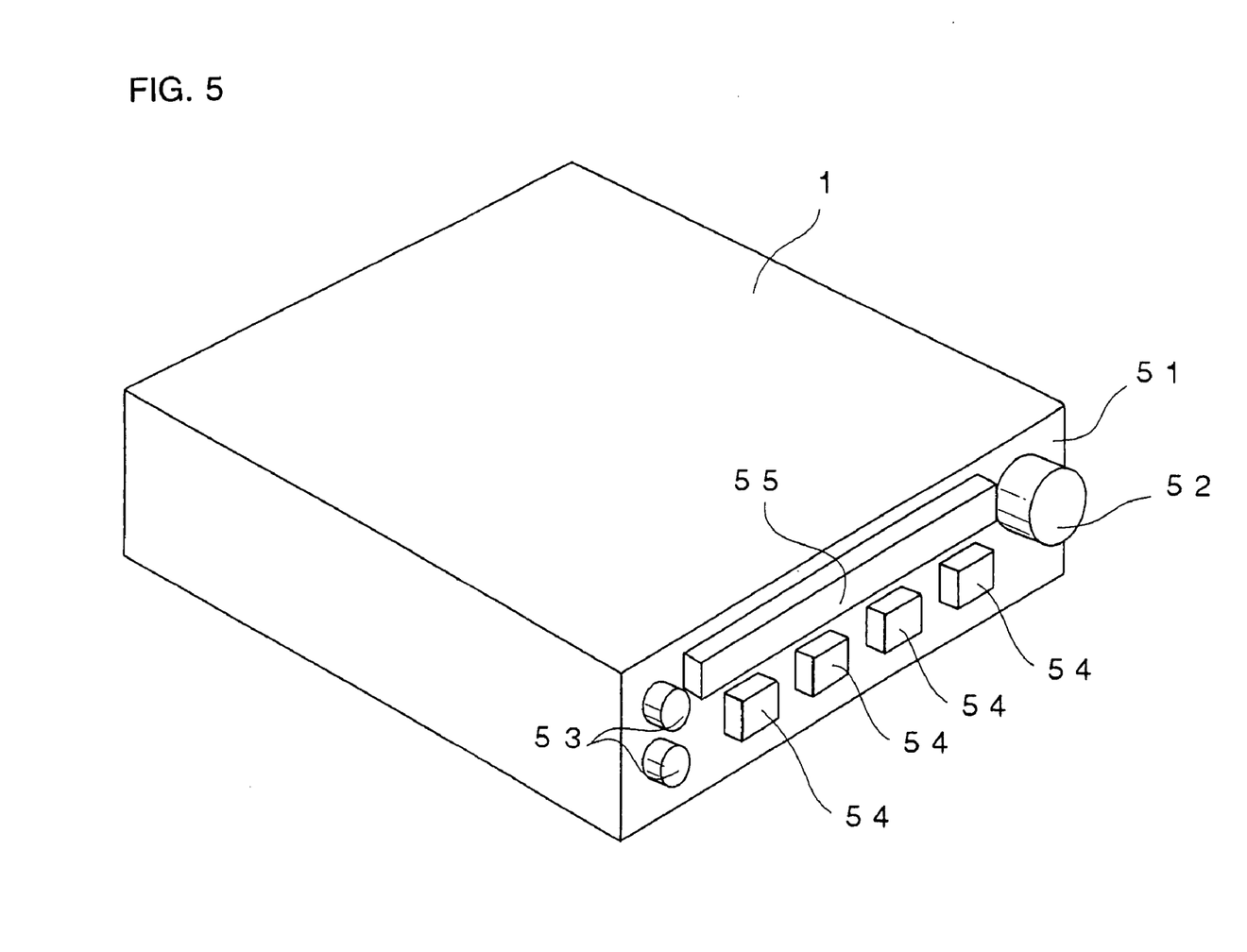
FIG. 5 is an external view of the information processing apparatus A 1.

FIG. 5 presents an external view of the information processing apparatus A 1. The information processing apparatus A 1 is housed in an 1DIN size case conforming to the DIN standard. Various dials 52 and 53, switches 54 and a display device 55 constituted with a 320×120 dot LCD, which are used for listening to radio broadcasts and the like, are mounted on a front panel 51. The current time point, the radio station to which the radio is currently tuned and other necessary information is displayed at the display device 55. The display device 55 is a smaller display device compared to the LCD panel 31, which can be manufactured at lower cost.

The information processing system A adopting the structure described above executes control related to the audio equipment in the vehicle, control on the CAN, a route search, road guidance (navigation) along a recommended route determined through the search, and the like. The arithmetic processing for the map display and the route search, both executed as part of the road guidance, need to be executed at high speed under normal circumstances. In the embodiment, the arithmetic processing unit 34 in the display device 3 is faster and achieves higher performance than the arithmetic processing unit 21 in the information processing apparatus A 1. For this reason, the arithmetic processing unit 21 in the information processing apparatus A 1 executes control related to the audio equipment in the vehicle, processing on various types of sensor data provided by the GPS device 8, the gyro 9 and the like and processing for reading the road map data, whereas the arithmetic processing unit 34 in the display device 3 executes the arithmetic processing for map display and the arithmetic processing for route search by using the sensor data having been processed at the arithmetic processing unit 21 of the information processing apparatus A 1 and the road map data. In this system, the arithmetic processing unit 21 and the arithmetic processing unit 34 exchange commands and data in conformance to specific protocols.

Figure 6:
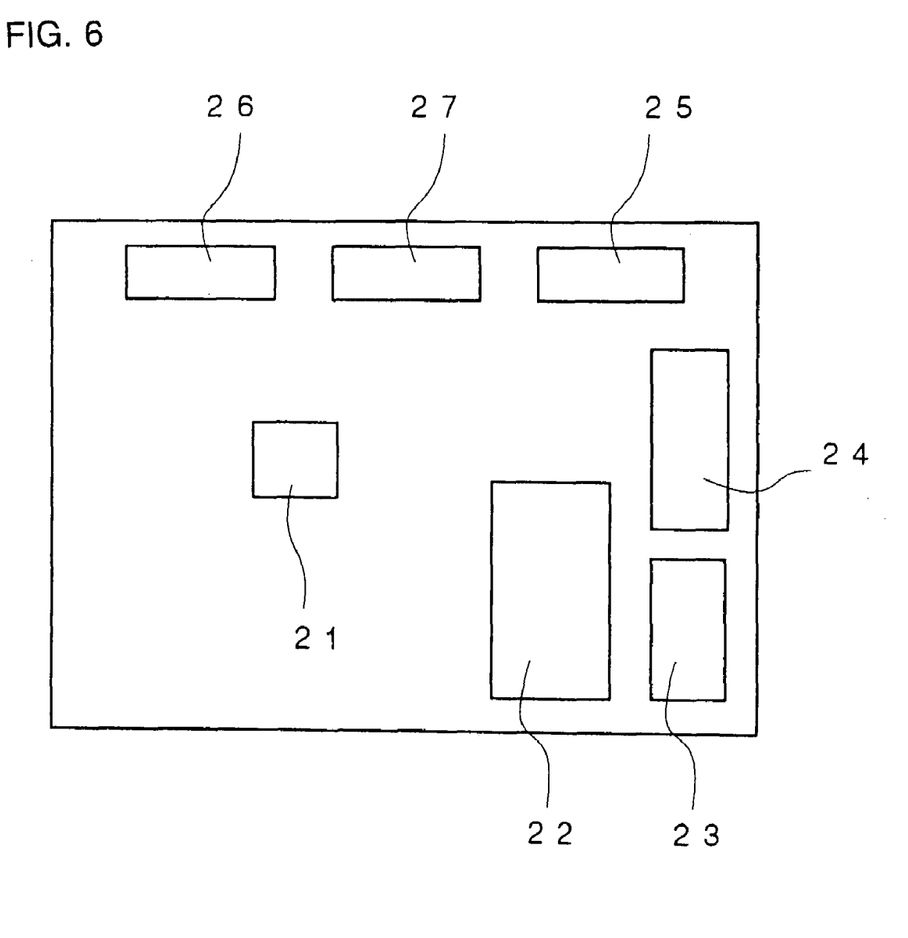
FIG. 6 is a block diagram of the internal structure adopted in the information processing apparatus B 2.

FIG. 6 is a block diagram of the internal structure adopted in the information processing apparatus B 2. The CD-ROM drive device 5, which is part of the internal structure, is not included in the illustration. The information processing apparatus B 2 comprises an arithmetic processing unit 21, an AM tuner 22, an FM multiplex tuner 23, an FM tuner 24, an audio amplifier 25, an optical fiber cable interface 26 and a CAN interface 27, all identical to those in the information processing apparatus A 1. However, the information processing apparatus B 2 does not include a GPS device 8 or a gyro 9. Namely, the information processing apparatus B 2 does not function as a car navigation system and only engages in audio control and CAN control.

As is the information processing apparatus A 1, the information processing apparatus B 2 is capable of reading data on a music CD-ROM 4 by using the CD-ROM drive device 5 and thus, the user in the vehicle can listen to music stored in the CD-ROM 4. In addition, the information processing apparatus B 2 may include a television broadcast receiving device so as to allow the user to watch television broadcast via the display device 3.

Figure 7:
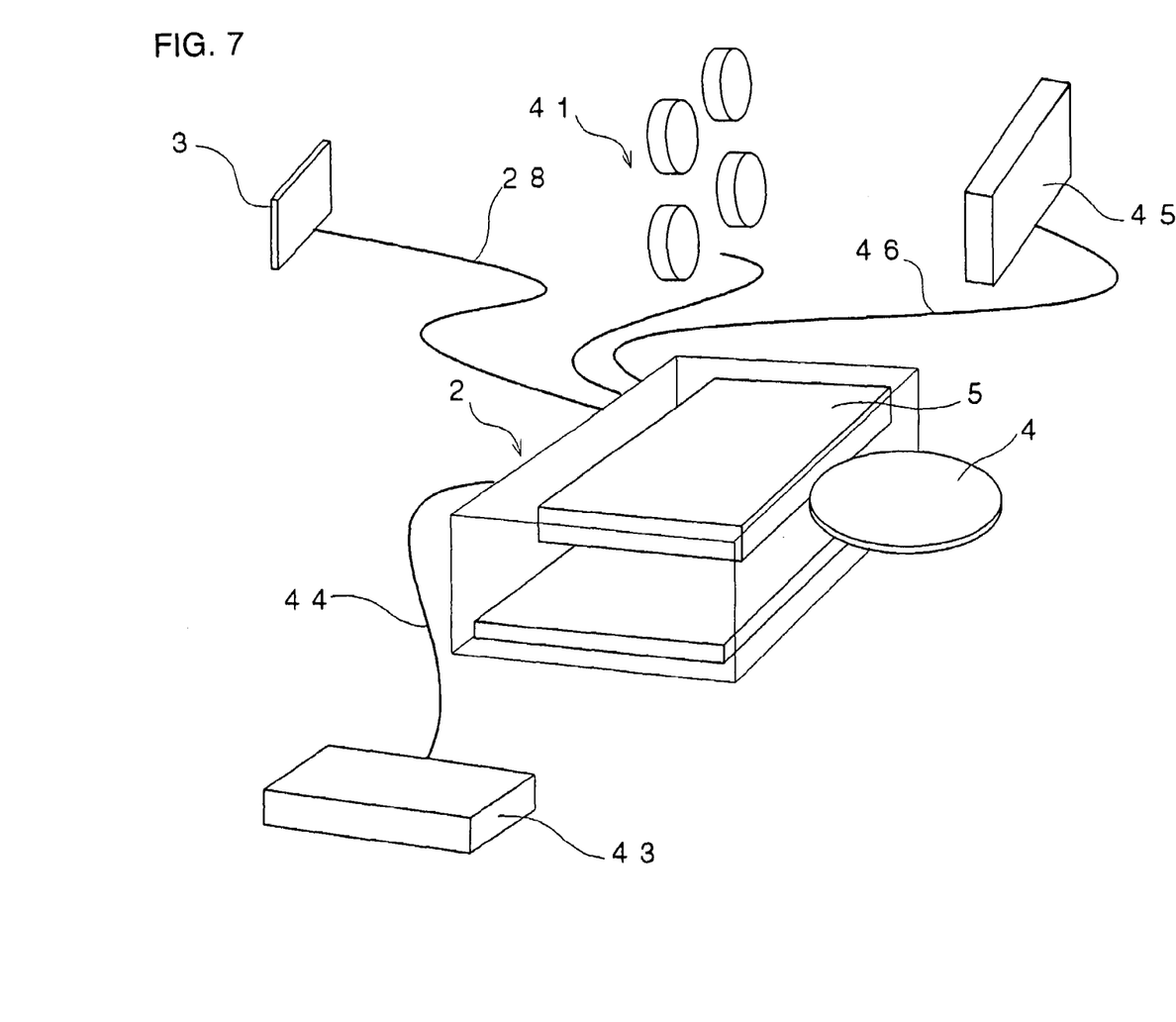
FIG. 7 illustrates how the information processing system B is achieved by connecting the information processing apparatus B 2 and the display device 3 to each other.

FIG. 7 shows how an information processing system B is achieved by connecting the information processing apparatus B 2 to the display device 3. The information processing apparatus B 2 and the display device 3 are connected with each other via a CAN cable 28 and the CAN interface 27. Alternatively, they may be connected by using an optical fiber cable and the optical fiber cable interface 26. In addition, the information processing apparatus B 2 is connected with speakers 41 installed in the vehicle through a cable 42. An FM antenna 43 is connected to the FM tuner 24 and the FM multiplex tuner 23 via a cable 44.

The information processing apparatus B 2 is also connected with a control switch group 45 via a CAN cable 46 and the interface 27 (see FIG. 6). This means that the information processing apparatus B 2 also controls the CAN in the vehicle. The external appearance of the information processing apparatus B 2 is similar to that presented in FIG. 5.

The information processing system B adopting the structure described above implements control on the audio equipment in the vehicle and CAN control. However, it does not have a road guidance (navigation) function.

As explained above, the information processing system A or the information processing system B can be constituted through a combination of the information processing apparatus A 1 or the information processing apparatus B 2 and the display device 3 achieved in the embodiment. For instance, the user may initially install the less expensive information processing system B by combining the information processing apparatus B 2 and the display device 3. Then, the user may subsequently decide that he needs a navigation function and in such a case, he can install the navigation function with ease simply by replacing the information processing apparatus B 2 with the information processing apparatus A 1.

Since the information processing apparatus A 1 and the information processing apparatus B 2 are identical except that the information processing apparatus A 1 includes the GPS device 8 and the gyro 9, a changeover to the information processing apparatus A 1 may be achieved simply by adding the GPS device 8 and the gyro 9 to the information processing apparatus B 2. While a common low-cost arithmetic processing unit 21 is utilized, the navigation function can be realized without problem since the high load navigation processing requiring high processing performance is executed at the high-performance arithmetic processing unit 34 in the display device 3. In short, various types of information processing apparatuses can be provided by using a less expensive, lower performance arithmetic processing unit compared to the arithmetic processing unit in the display device, and the relatively high-performance arithmetic processing unit in the display device can be used in conjunction with the various information processing apparatuses. By adopting such a configuration, it becomes possible to realize various types of information processing systems from low performance to high-performance, with a high degree of efficiency.

In addition, the information processing apparatus A 1 includes audio circuits such as the AM tuner 22, the FM tuner 24 and the audio amplifier 25. These circuits tend to be readily affected by noise. Since a high-performance arithmetic processing unit that is driven by a high frequency clock is likely to become a source of noise, it is also extremely advantageous to separate the audio related circuits from the high-performance arithmetic processing unit from the viewpoint of noise suppression as well.

SECOND EMBODIMENT

In the first embodiment, the car navigation function is realized in the information processing system A which is constituted by combining the information processing apparatus A 1 with the display device 3. In this navigation, road guidance is provided by displaying a road map at the display device 3. However, car navigation can be provided through the information processing apparatus A 1 by itself if road guidance is to be provided through a simple display of an arrow or the like alone. Hereafter, the type of navigation provided simply by displaying an arrow without displaying a road map is referred to as arrow navigation. Since the structure of the information processing apparatus in this embodiment is similar to that of the information processing apparatus A 1 in the first embodiment, its explanation is omitted.

Figure 8:
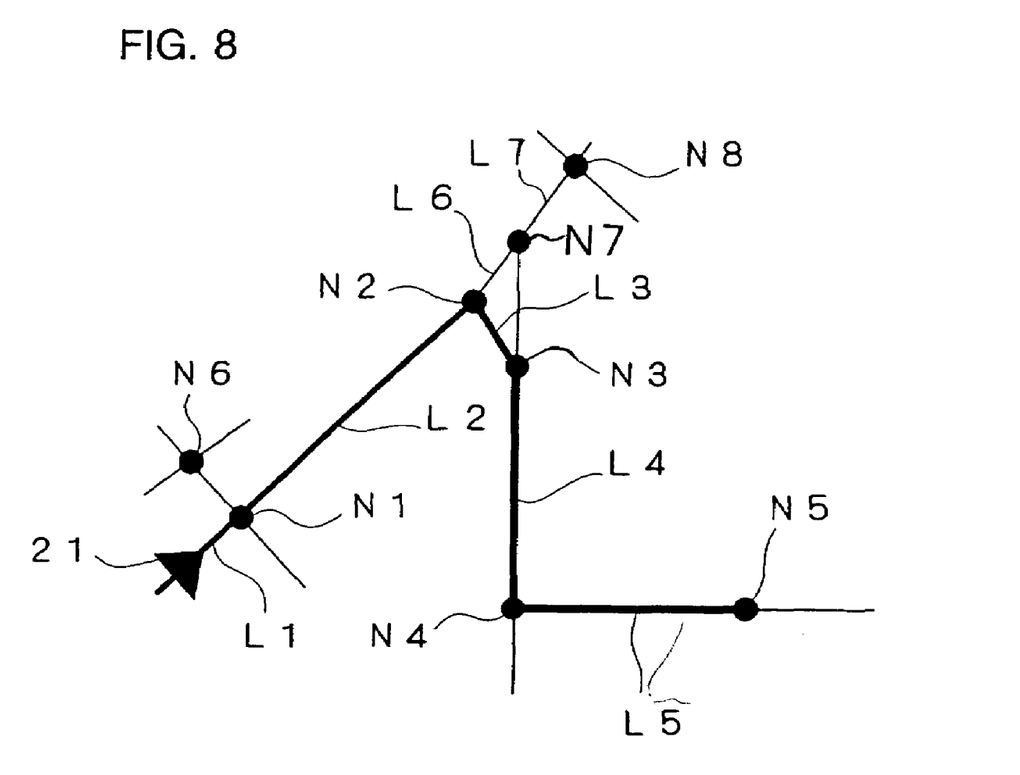
FIG. 8 is a road map provided to illustrate the arrow navigation achieved in a second embodiment.
Figure 9:
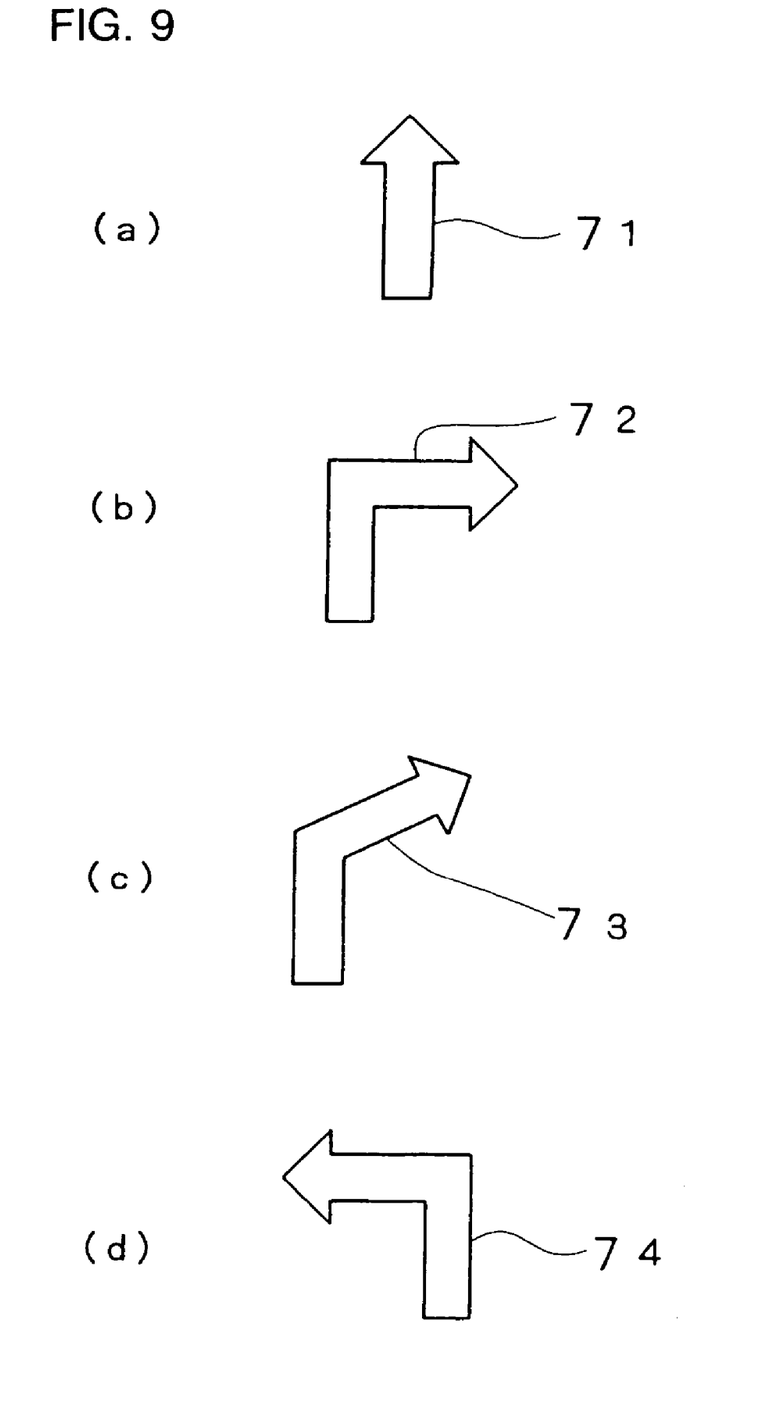
FIG. 9 presents examples of arrows used in the arrow navigation in the second embodiment.

Arrow navigation is now explained in reference to FIGS. 8 and 9. FIG. 8 shows a road map provided to facilitate the explanation of arrow navigation. Roads are expressed by nodes, links and link strings in the embodiment. A node is equivalent to an intersecting point of roads or a branching point of a road and a link is equivalent to a road that connects nodes. A link string is a string of a plurality of continuous links. For instance, National Highway #1 is divided into a plurality of link strings and a single link string represents National Highway #1 from a given point to another point. In the following explanation, intersecting points and branching points are simply referred to as nodes and roads connecting intersecting points are simply referred to as links.

Road data are stored in a CD-ROM 4. The road data are constituted with node connection data and guidance data. The arithmetic processing unit 21 reads the road data stored in the CD-ROM 4 with the CD-ROM drive device 5 and uses the road data thus read in arrow navigation control. These road data do not include data used for road map display.

The node connection data contain connection information (network information) indicating how the nodes described above connect with other nodes. As the node connection data, the positional coordinates of the subject node and the node numbers assigned to adjacent nodes are stored in correspondence to each node. A node number is assigned to each node by adopting a predetermined method. The node connection data, which contain the information related to the connections between nodes, can be used for route search and arrow navigation guidance. The guidance data include intersecting point data and branching point data. For instance, data indicating the names of intersecting points and branching points are stored as the guidance data. By using the guidance data, the name of a specific intersecting point and the like can be brought up on display when guiding the vehicle through the arrow navigation.

FIG. 8 shows a road map over a specific range, displayed by using nodes, links and link strings explained above. Reference numerals N1 to N8 each indicate a node, whereas reference numerals L1 to L7 each indicate a link. Assuming that the road extending through the links L1, L2, L6 and L7 is, for instance, National Highway #1, the links L1, L2, L6 and L7 are all contained in a single link string. A triangle mark 61 indicates the current vehicle position (subject vehicle position), and the bold line indicates the recommended route calculated through a route search. In other words, the vehicle 61 is on its way to the destination by traveling through the node N1 and making a right turn, a left turn or the like at each of the nodes N2, N3 and N4.

Next, an explanation is given on how the information processing apparatus A1 achieved in the embodiment guides the vehicle along the recommended route shown in FIG. 8. An arrow 71 shown in FIG. 9(a) is displayed at the display device 55 while the vehicle 61 travels through the links L1 and L2. At the display device 55 constituted with a 320×120 dot LCD, arrows indicating accurate degrees of turns as well as a straight arrow can be displayed. The arrow 71 is a simple upward facing arrow. This upward facing arrow 71 indicates that the vehicle is to travel straight ahead along the advancing direction. In other words, when the vehicle is to travel straight ahead along the advancing direction, the arrow on display remains facing upward regardless of the advancing azimuth of the vehicle. While the vehicle travels past the node N1, it still only needs to advance through the links L1 and L2 in the same link string, and thus, the arrow 71 is displayed in this situation. It is to be noted that the current position of the vehicle 61 is calculated by the arithmetic processing unit 21 based upon the position signal provided by the GPS device 8.

Next, as the vehicle 61 approaches the node N2, the display at the display device 55 is switched to an arrow 72 in FIG. 9(b). The arrow 72 indicates that the vehicle is to make a 90° right turn at the next intersecting point. The arrow 72 with a 90° bend is displayed in this situation since the line connecting the node N2 to the node N3 forms an angle of approximately 90° relative to the line connecting the current vehicle position and the node N2. A decision as to whether or not the vehicle 61 is approaching the node N2 is made based upon the positional coordinates of the current vehicle position and the positional coordinates of the node N2. The positional coordinates of each node are stored in the node connection data explained earlier. For instance, when the current vehicle position is 100 m to the node N2, the vehicle 61 may be judged to be approaching the node N2 and the arrow 72 may be brought up on display. The value used in this judgment may be other than 100 m.

As soon as the vehicle 61 makes the 90° right turn at the node N2, the display at the display device 55 is switched to an arrow 73 shown in FIG. 9(c). Turn information indicating a turn to make at the next node N3 is brought up on display immediately since the distance between the nodes N2 and N3 is equal to or less than 100 m. The arrow 73 bends to the right at an angle of 45° since the line connecting the node N3 to the node N4 forms an angle of approximately 45° to the right relative to the line connecting the current vehicle position to the node N3.

After the vehicle 61 makes the right turn by an angle of approximately 45° into the link L4 at the node N3, the display at the display device 55 is switched back to the arrow 71 in FIG. 9(a), since the vehicle is to advance straight ahead through the link L4 for the time being. As the vehicle advances to a point 100 m from the node N4, the display at the display device 55 is switched to an arrow 74 in FIG. 9(d). The arrow 74 indicates that the vehicle is to make a 90° left turn at the next intersecting point. The arrow 74 with a 90° bend to the left is displayed since the line connecting the node N4 to the node N5 forms an angle of approximately 90° relative to the line connecting the current vehicle position and the node N4.

Figure 10:
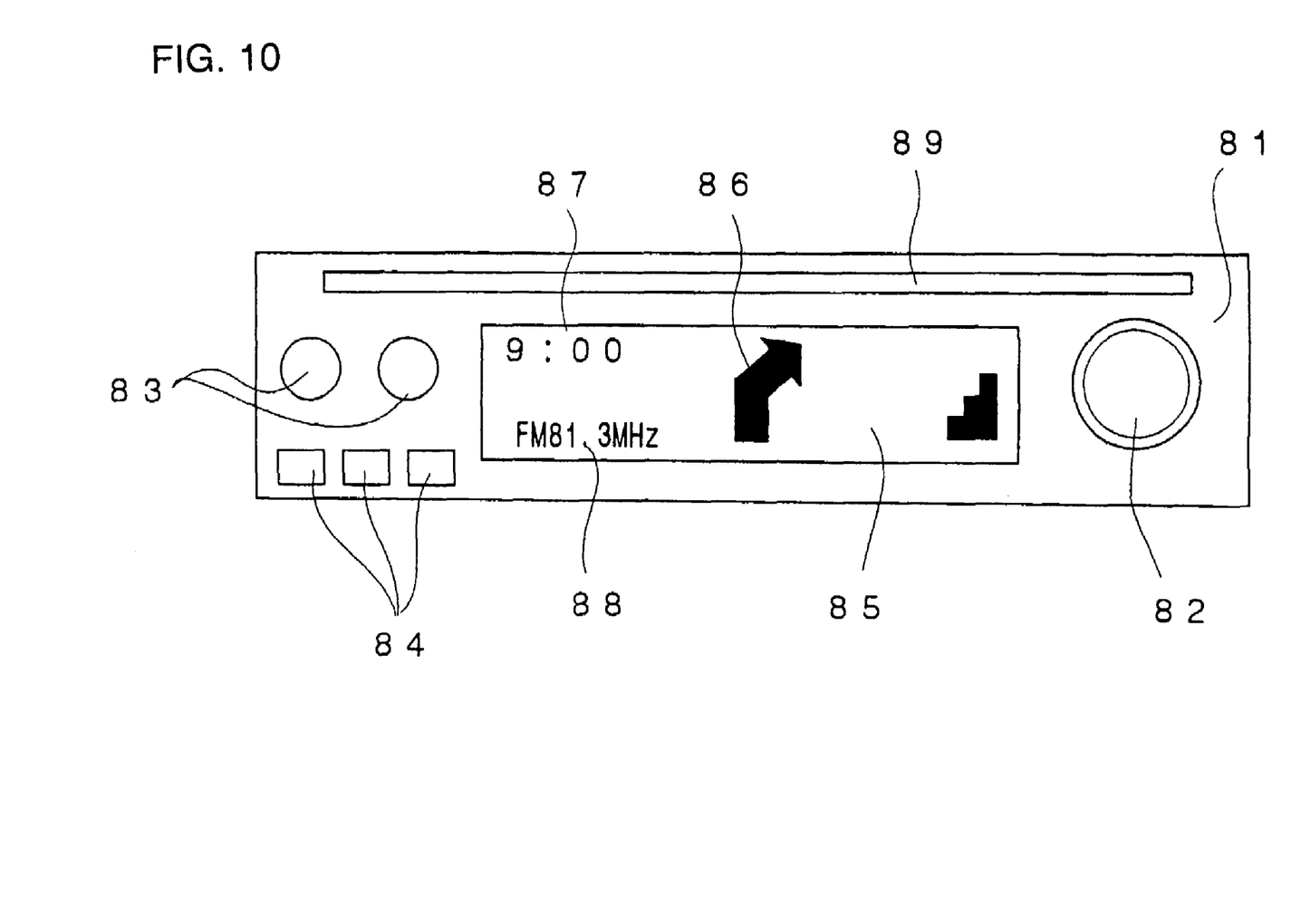
FIG. 10 is a front view of the front panel of the information processing apparatus A 1 achieved in the second embodiment.

Thus, the vehicle 61 is navigated with the arrow on display which is bent with an angle corresponding to the advancing direction. FIG. 10 is a front view of a front panel 81 of the information processing apparatus A1. At the front panel 81, various dials 82 and 83, switches 84 and a display device 85 constituted with a 320×120 dot LCD are mounted. At the display device 85, an arrow display 86 for the arrow navigation, a current time point display 87 and a radio station display 88 indicating the radio station to which the radio is currently tuned are displayed. In addition, a slot 89 at which the CD-ROM is loaded is provided at the information processing apparatus. While the information processing apparatus A1 only includes a CD-ROM drive device and only a CD-ROM, the display device may also have a DVD slot if the information processing apparatus includes a DVD drive device as well.

It is to be noted that in the example explained above, the angle with which the arrow bends is calculated in reference to the next guidance point. Instead, the angle with which the arrow bends may be calculated in reference to the current vehicle position. Namely, the direction along which the vehicle 61 is to advance may be indicated based upon the angle formed by the line connecting the current position of the vehicle 61 and the positional coordinates of the second guidance point from the current position and the advancing direction of the vehicle 61. The degree of bend in the arrow changes subtly as the vehicle 61 approaches the next guidance point node. When the vehicle finally arrives at the node, the angle with which the arrow bends matches the angle formed by the vehicle advancing direction and the direction along which the vehicle heads for the next guidance point node from the node it has just reached. In other words, when a bent arrow is on display, the direction of the arrow indicates the direction toward the second guidance point from the current vehicle position at all times in this example.

By enabling the information processing apparatus A 1 to provide simple arrow navigation as described above, an arrow navigation function can be initially installed through an inexpensive information processing apparatus A 1 alone. Subsequently, if the user decides that he needs a navigation function with high-performance map display, he only needs to add the display device 3 and replace the control program in the information processing apparatus A 1.

As described above, by adopting the second embodiment, too, a switchover from a low cost, low performance system to a high performance system can be effected with ease and efficiency.

With the information processing systems achieved in the first and second embodiments, which are structured as described above, various functions including the navigation function can be combined in an on-vehicle information processing system with a high degree of efficiency.

The invention claimed is:

1. A display device comprising:
a first arithmetic processing unit;
a display unit at which information is displayed as a bitmap; and
an interface unit that can be connected with an external information processing apparatus having a second arithmetic processing unit which executes a specific type of processing and a drive device that reads road map data from a CD-ROM or a DVD, wherein:
the first arithmetic processing unit controls the display unit so as to display information related to the specific type of processing transmitted from the external information processing apparatus and also executes another type of processing related to the specific type of processing based upon an instruction provided by the external information processing apparatus;
the specific type of processing executed at the second arithmetic processing unit includes processing related to road guidance that contains current-position-detection processing with GPS signals and processing for reading the road map data with the drive device;
the another type of processing executed at the first arithmetic processing unit uses the road map data read with the drive device in the external information processing apparatus and includes at least either arithmetic processing for displaying a road map at the display unit or arithmetic processing for a route search, and
the first arithmetic processing unit achieves a higher processing performance level than the second arithmetic processing unit.

2. An information processing apparatus comprising:
an interface unit that can be connected with a display device having a first arithmetic processing unit and a display unit controlled by the first arithmetic processing unit, at which information is displayed as a bitmap;
a second arithmetic processing unit that executes a specific type of processing; and
a drive device that reads road map data from a CD-ROM or a DVD, wherein:
the second arithmetic processing unit issues an instruction to have the first arithmetic processing unit at the display device execute another type of processing related to the specific type of processing;
the specific type of processing executed at the second arithmetic processing unit includes processing related to road guidance that contains current-position-detection processing with GPS signals and processing for reading the road map data with the drive device;
the another type of processing executed at the first arithmetic processing unit uses the road map data road with the drive device and includes at least either arithmetic processing for displaying a road map at the display unit or arithmetic processing for a route search, and
the first arithmetic processing unit achieves a higher processing performance level than the second arithmetic processing unit.

3. An information processing apparatus according to claim 2, further comprising:
a second display unit smaller in size than the display unit of the display device.

4. An information processing apparatus according to claim 2, further comprising:
a second display unit smaller in size than the display unit of the display device, wherein:
the second arithmetic processing unit executes the processing related to road guidance by displaying at the second display unit a straight arrow or a bent arrow without displaying a map.

5. An information processing system comprising:
a display device: and
an information processing apparatus, wherein:
the information processing apparatus comprises an interface unit that can be connected with the display device, a second arithmetic processing unit that executes a specific type of processing and a drive device that reads road map data from a CD-ROM or a DVD;
the display device comprises a first arithmetic processing unit, a display unit at which information is displayed as a bitmap, and an interface unit that can be connected with the information processing apparatus;
the second arithmetic processing unit issues an instruction to have the first arithmetic processing unit at the display device execute another type of processing related to the specific type of processing;
the first arithmetic processing unit controls the display unit so as to display information related to the specific type of processing transmitted from the information processing apparatus and also executes the another type of processing related to the specific type of processing based upon the instruction provided by the information processing apparatus;
the specific type of processing executed at the second arithmetic processing unit includes processing related to road guidance that contains current-position-detection processing with GPS signals and processing for reading the road map data with the drive device;
the another type of processing executed at the first arithmetic processing unit uses the road map data read with the drive device in the information processing apparatus and includes at least either arithmetic processing for displaying a road map at the display unit or arithmetic processing for a route search; and
the first arithmetic processing unit achieves a higher processing performance level than the second arithmetic processing unit 6. An information processing system according to claim 5, wherein:
the information processing apparatus further includes a radio tuner; and
the second arithmetic processing unit executes audio processing.

7. An information processing system comprising:
a first information processing apparatus that executes a first processing;
a second information processing apparatus that does not execute the first processing and executes a second processing;
a display device that can be connected with the first information processing apparatus or the second information processing apparatus, wherein:
the display device is connected with the first information processing apparatus to achieve a first information processing system;
the display device is connected with the second information processing apparatus to achieve a second information processing system;
the display device comprises a first arithmetic processing unit, a display unit at which information is displayed as a bitmap, and an interface unit that can be connected with the first information processing apparatus or the second information processing apparatus;
the first arithmetic processing unit controls the display unit so as to display information related to the first processing transmitted from the first information processing apparatus and also executes another type of processing related to the first processing based upon an instruction provided by the first information processing apparatus, when the interface unit is connected with the first information processing apparatus to achieve the first information processing system; and
the first arithmetic processing unit does not execute the another type of processing related to the first processing, when the interface unit is connected with the second information processing apparatus to achieve the second information processing system.

8. An information processing system according to claim 7, wherein:
the another type of processing related to the first processing needs to be executed at higher speed than the first processing; and
the first arithmetic processing unit achieves a higher processing performance level than a second arithmetic processing unit that is provided in the first information processing apparatus and executes the first processing.

9. An information processing system according to claim 8, wherein:
the first processing executed at the second arithmetic processing unit includes processing related to road guidance that contains current-position-detection processing with GPS signals; and
the another type of processing related to the first processing executed at the first arithmetic processing unit includes at least either arithmetic processing for displaying a road map at the display unit or arithmetic processing for a route search.

10. An information processing system according to claim 7, wherein:
the first information processing apparatus executes the second processing in addition to the first processing;
the first processing includes processing related to road guidance; and
the second processing includes processing related to audio.

11. A display device according to claim 1, wherein:
the interface unit can be connected with another external information processing apparatus instead of the external information processing apparatus, the another external information processing apparatus does not execute the specific type of processing; and
the first arithmetic processing unit does not execute the another type of processing related to the specific type of processing when the interface unit is connected with the another external information processing apparatus.

* * * * *